(12) United States Patent
Min et al.

(10) Patent No.: US 9,344,618 B2
(45) Date of Patent: May 17, 2016

(54) ELECTRONIC DEVICE AND METHOD OF OPERATING THE SAME

(71) Applicant: LG Electronics Inc., Seoul (KR)

(72) Inventors: Kyungyeon Min, Seoul (KR); Taekyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/324,947

(22) Filed: Jul. 7, 2014

(65) Prior Publication Data

US 2015/0009372 A1 Jan. 8, 2015

(30) Foreign Application Priority Data

Jul. 8, 2013 (KR) .......................... 10-2013-0079773

(51) Int. Cl.
*H04N 5/262* (2006.01)
*H04N 5/232* (2006.01)
*H04N 5/225* (2006.01)
*H04N 5/247* (2006.01)

(52) U.S. Cl.
CPC ......... *H04N 5/23212* (2013.01); *H04N 5/2258* (2013.01); *H04N 5/23296* (2013.01); *H04N 5/247* (2013.01)

(58) Field of Classification Search
CPC ...................................... H04N 5/262

USPC ............................................... 348/240.3, 347
See application file for complete search history.

(56) References Cited

U.S. PATENT DOCUMENTS

| 2005/0219386 A1* | 10/2005 | Stavely et al. ............. 348/240.3 |
| 2005/0219393 A1 | 10/2005 | Sugimoto |
| 2006/0139463 A1* | 6/2006 | Heinonen ..................... 348/239 |
| 2012/0008011 A1* | 1/2012 | Garcia Manchado ..... 348/231.2 |
| 2012/0133822 A1* | 5/2012 | Kawai ........................... 348/347 |

FOREIGN PATENT DOCUMENTS

| EP | 2 328 018 A1 | 6/2011 |
| EP | 2 466 357 A1 | 6/2012 |
| JP | 2002-335436 A | 11/2002 |
| WO | WO 2006/067545 A1 | 6/2006 |

* cited by examiner

*Primary Examiner* — Joel Fosselman
(74) *Attorney, Agent, or Firm* — Birch, Stewart, Kolasch & Birch, LLP

(57) ABSTRACT

An electronic device including a first camera configured to capture a first front image; a display module configured to display a preview screen of the first front image obtained by the first camera; and a controller configured to receive a focus input designating an object included in the preview screen is to be focused, receive an input for performing continuous shooting, and control the first camera to capture a plurality of images in different zoom levels while maintaining a focus on the designated object intact based on the received input for performing the continuous shooting.

6 Claims, 20 Drawing Sheets

Configuration of group image

Icon of group image

FIG. 10
(a) Preview screen
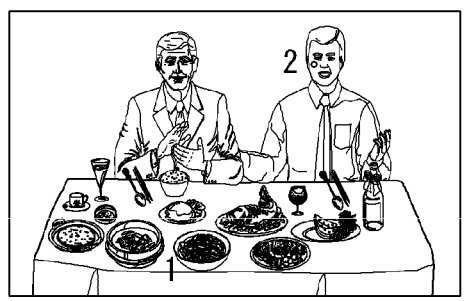
Continuous shooting
(b) First image
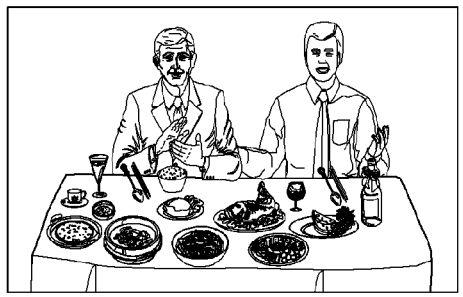
Zoom-in
(c) Second image
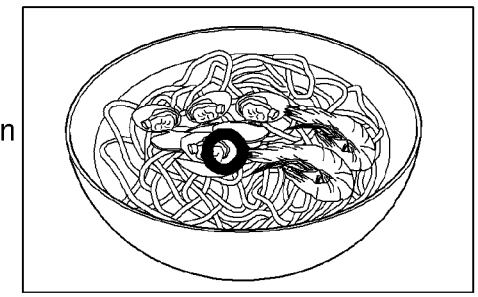

FIG. 11
(a) Preview screen
⇓ Continuous shooting
(b) First image
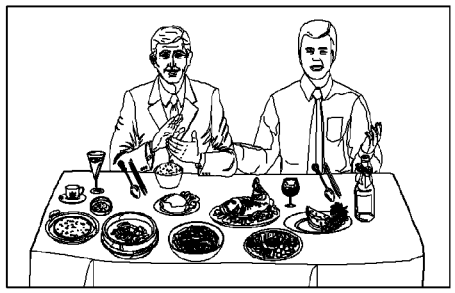
Zoom-in ⇒
(c) Second image
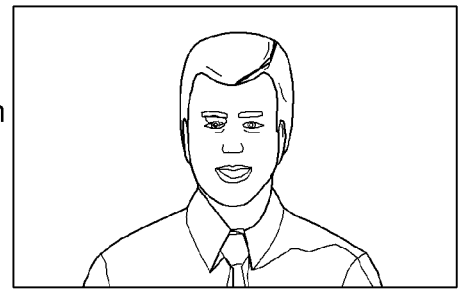

FIG. 15
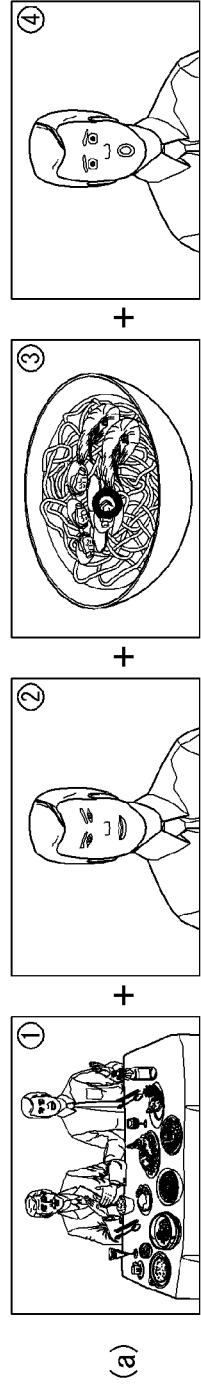
(a) Configuration of group image
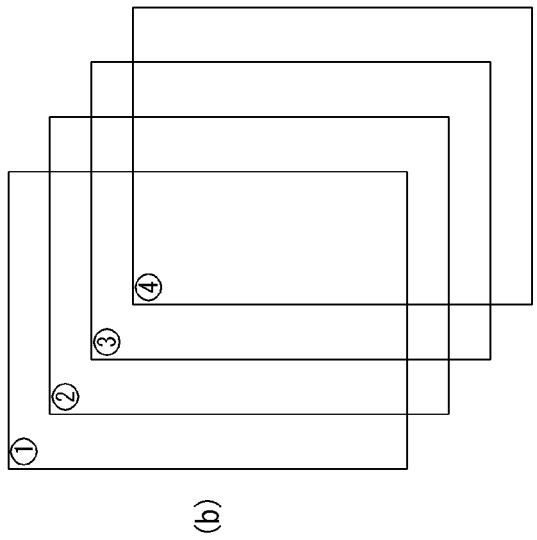
(b) Icon of group image

ELECTRONIC DEVICE AND METHOD OF OPERATING THE SAME

CROSS-REFERENCE TO RELATED APPLICATION

Pursuant to 35 U.S.C. §119(a), this application claims the benefit of earlier filing date and right of priority to Korean Patent Application No. 10-2013-0079773, filed on 8 Jul. 2013, the contents of which are incorporated by reference herein in their entirety.

BACKGROUND OF THE INVENTION

1. Field of the Invention

The present invention relates to an electronic device, and more particularly, to an electronic device for performing continuous shooting in a different zoom level while maintaining the focusing state of a subject or object and a method of operating the same.

2. Discussion of the Related Art

As the functions of a terminal, such as a personal computer, a laptop computer, a mobile phone, or a smart phone, are diversified, the terminal has been implemented in the form of a multimedia player equipped with complex functions, such as the photographing of photos or moving images, the playback of music or video files, gaming, and the reception of broadcasting.

In order to support and increase the functions of the terminal, the improvement of structural parts or software parts or both of the terminal may be taken into consideration. As various kinds of terminals including mobile terminals recently provide complex and various functions, a menu structure is also complicated.

A camera function is mounted on various kinds of electronic devices including such mobile terminals. Most of the cameras provide a continuous shooting function. The continuous shooting function is performed based on a predetermined focus and a predetermined zoom level. Accordingly, the range of photographing is inevitably fixed upon continuous shooting. It is also not easy to continuously photograph a plurality of subjects or objects.

SUMMARY OF THE INVENTION

An object of the present invention is to provide an electronic device for performing a continuous shooting function in a different zoom level after focusing and a method of operating the same.

Another object of the present invention is to provide an electronic device for grouping and storing a plurality of images continuously captured in different zoom levels and a method of operating the same.

Yet another object of the present invention is to provide an electronic device configured to be set so that grouped and stored images are displayed in the order of photographing and a method of operating the same.

Technical objects to be achieved by the present invention are not limited to the above-described objects and other technical objects that have not been described will be evidently understood by those skilled in the art from the following description.

An electronic device according to an aspect of the present invention includes a first camera configured to capture a first front image, a display module configured to display a preview screen of the first front image obtained by the first camera, and a controller configured to receive a focus input designating an object included in the preview screen is to be focused, receive an input for performing continuous shooting, and control the first camera to capture a plurality of images in different zoom levels while maintaining a focus on the designated object intact based on the received input for performing the continuous shooting.

The controller may be further configured to control the first camera to capture the plurality of images so a corresponding capture screen area of the images zooms in or zooms out in which the designated object is placed at a central region of a corresponding captured image.

The controller may be further configured to control the first camera to capture the plurality of images so a corresponding capture screen area of the images zooms in while the object gradually moves to a central region of a corresponding captured image or to control the first camera to capture the plurality of images so the corresponding capture screen area of the images zooms out while the object gradually becomes distant from a central region of the corresponding captured image.

The electronic device may further include a memory configured to store the plurality of images. The controller may be further configured to receive a selection signal indicating a selection of a specific image among the plurality of stored images, display the specific image on the display module, receive a selection of a corresponding designated object in the displayed specific image, and display a zoom-in image of the designated object, based on the received selection signal.

The electronic device may further include memory. The controller may be further configured to group and store at least two of the plurality of captured images in the memory, and perform a setting so the at least two images are sequentially displayed in order of photographing.

The focus input includes a designation of a first object and a second object in the preview screen. The controller may be further configured to control the first camera to capture a first image group in which the first object zooms in or zooms out while a focus on the first object remains intact, and capture a second image group in which the second object zooms in or zooms out while a focus on the second subject remains intact.

The controller may be further configured to group and store at least two images of each of the first image group and the second image group, and perform a setting so that the at least two images are sequentially displayed in order of photographing.

The display module may be further configured to include a touch screen, and the controller may be further configured to receive a touch selection of the object among a plurality of objects included in the image as the focus input for designating the object.

The electronic device may further include a second camera configured to capture a rear image. The controller may be further configured to control the second camera to capture at least one image of a photographer when the plurality of images is captured by the first camera, group and store at least two of the plurality of images and the at least one photographer image, and perform a setting so that the at least two images and the at least one photographer image are displayed in order of photographing.

The controller may be further configured to control the second camera to capture a plurality of images of a face of the photographer when the plurality of images of the photographer is captured by the first camera, group and store the at least two images and at least two of the plurality of photographer images, and perform a setting so that the at least two images and the at least two photographer images are displayed in order of photographing.

A method of controlling an electronic device according to an aspect of the present invention may include capturing, via a first camera of the mobile terminal, a first front image, displaying via a display module of the mobile terminal, a preview screen of the first front image obtained by the first camera, receiving, via the controller, an input for performing continuous shooting; and controlling, via the controller, the first camera to capture a plurality of images in different zoom levels while maintaining a focus on the designated object intact based on the received input for performing the continuous shooting.

The method may further include controlling the first camera to capture the plurality of images so a corresponding capture screen area of the images zooms in or zooms out when the designated object is placed at the central region of a corresponding captured image.

The method may further include controlling the first camera to capture the plurality of images so a corresponding capture screen area of the images zooms in while the object gradually moves to the central region of a corresponding captured image or controlling the first camera to capture the plurality of images so the corresponding capture screen area of the images zooms out while the object gradually becomes distant from the central region of the corresponding captured image.

In this instance, the electronic device may further include memory configured to store the plurality of images. The method may further include receiving a selection signal indicating a selection of a specific image among the plurality of images stored in a memory, displaying the specific image on the display module, receiving a selection of a corresponding designated object in the displayed specific image, and displaying a zoom-in image of the designated object on the display module, based on the received selection signal.

The method may further include grouping and storing at least two of the plurality of captured images in the memory and performing a setting so that the at least two images are sequentially displayed in order of photographing.

The focus input includes a designation of a first object and a second object in the preview screen. The method may further include controlling the first camera to capture a first image group in which the first object zooms in or zooms out while a focus on the first object remains intact, and capturing a second image group in which the second object zooms in or zooms out while a focus on the second subject remains intact.

The method may further include grouping and storing at least two images of each of the first image group and the second image group, and performing a setting so that the at least two images are sequentially displayed in order of photographing.

Meanwhile, the electronic device may further include a touch screen.

The method may further include designating, as a focused subject, a subject that belongs to a plurality of subjects displayed on the preview screen displayed on the touch screen and that has been selected by a touch.

The electronic device may further include a second camera configured to capture a rear image.

The method may further include controlling the second camera on the mobile terminal to capture at least one image of a photographer when the plurality of images is captured by the first camera, grouping and storing at least two of the plurality of images and the at least one photographer image and performing a setting so that the at least two images and the at least one photographer image are displayed in order of photographing.

The method may further include controlling the second camera to capture a plurality of images of a face of the photographer when the plurality of images of the photographer is captured by the first camera, grouping and storing the at least two images and at least two of the plurality of photographer images, and performing a setting so that the at least two images and the at least two photographer images are displayed in order of photographing.

The method of operating the electronic device according to an embodiment of the present invention may be implemented by executing a computer program for implementing the method of operating the electronic device stored in a computer-readable recording medium.

In accordance with an embodiment of the present invention, a user can obtain a plurality of images having variety kinds of photographing ranges can be obtained because continuous shooting is performed in a zoom level.

In accordance with an embodiment of the present invention, a user can obtain at least some continuous images that belong to a plurality of images continuously captured in different zoom levels and that are grouped and stored. Furthermore, a user can obtain continuous images whose order of display has been set in the order of photographing and stored.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIG. 10 illustrates an example in which continuous shooting is performed on a plurality of subjects in accordance with the method of operating the electronic device illustrated in FIG. 9;

FIG. 11 illustrates another example in which continuous shooting is performed on a plurality of subjects in accordance with the method of operating the electronic device illustrated in FIG. 9;

FIG. 15 illustrates an example in which a group image is generated and stored in accordance with the method of operating the electronic device illustrated in FIG. 12;

DETAILED DESCRIPTION OF THE EMBODIMENTS

Arrangements and embodiments may now be described more fully with reference to the accompanying drawings, in which embodiments may be shown. Embodiments may, however, be embodied in many different forms and should not be construed as being limited to embodiments set forth herein; rather, embodiments may be provided so that this invention will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
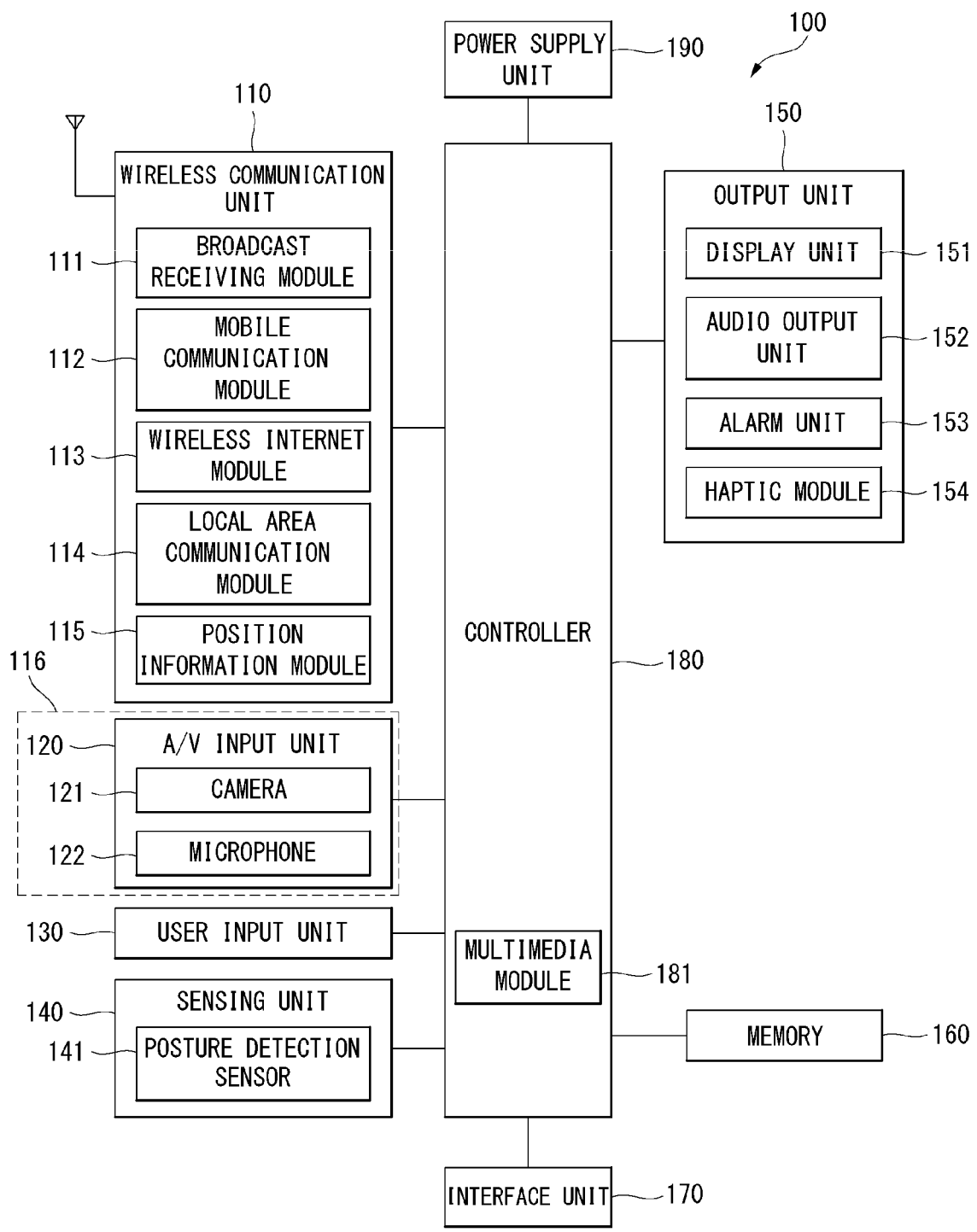
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display unit 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

As illustrated in FIG. 1, the A/V input unit 120 and the user input unit 130 may be implemented into a single input unit input unit 116. A variety of kinds of input data generated by the input unit 116 may be used to activate or deactivate memo-related functions performed in the mobile terminal 100 according to an embodiment of the present invention, such as a memo writing function, a memo storage function, and a memo insertion function through the display unit 151 implemented using a touch screen. The input data may include images received through the camera 121, a user's voice received through the microphone 122, touches received through the display unit 151, and so on. However, the scope of the present invention is not limited to the aforementioned input data.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface 170 is connected to an external device.

The sensing unit 140 may also include a proximity sensor and a posture detection sensor 141. The sensing unit 140 may sense a motion of the mobile terminal 100. The posture detection sensor 141 can detect a posture of the mobile terminal 100 (e.g., when the terminal 100 is laid on a table flat, raised at an angle to the user can view information on the display unit 151, is turned upside down, etc.).

The output unit 150 may generate visual, auditory and/or tactile output, and the output unit 150 may include the display unit 151, an audio output unit 152, an alarm unit 153 and a haptic module 154. The display unit 151 may display information processed by the mobile terminal 100. The display unit 151 may display a user interface (UI) and/or a graphic user interface (GUI) related to a telephone call when the mobile terminal 100 is in the call mode. The display unit 151 may also display a captured and/or received image, a UI or a GUI when the mobile terminal 100 is in the video telephony mode or the photographing mode.

The display unit 151 may include at least one of a liquid crystal display, a thin film transistor liquid crystal display, an organic light-emitting diode display, a flexible display and/or a three-dimensional display. The display unit 151 may be of a transparent type or a light transmissive type. That is, the display unit 151 may include a transparent display.

The transparent display may be a transparent liquid crystal display. A rear structure of the display unit 151 may also be of a light transmissive type. Accordingly, a user may see an object located behind the body (of the mobile terminal 100) through the transparent area of the body of the mobile terminal 100 that is occupied by the display unit 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display unit 151 and a sensor sensing touch (hereafter referred to as a touch sensor) form a layered structure that is referred to as a touch screen, the display unit 151 may be used as an input device in addition to an output device. The touch sensor may be in the form of a touch film, a touch sheet, and/or a touch pad, for example.

The touch sensor may convert a variation in pressure applied to a specific portion of the display unit 151 or a variation in capacitance generated at a specific portion of the display unit 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display unit 151.

The proximity sensor (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output unit 152 may output audio data received from the wireless communication unit 110 or stored in the memory 160 in a call signal receiving mode, a telephone call mode or a recording mode, a speech recognition mode and a broadcasting receiving mode. The audio output unit 152 may output audio signals related to functions, such as a call signal incoming tone and a message incoming tone, performed in the mobile terminal 100. The audio output unit 152 may include a receiver, a speaker, a buzzer, and/or the like. The audio output unit 152 may output sounds through an earphone jack. The user may hear the sounds by connecting an earphone to the earphone jack.

The alarm unit 153 may output a signal for indicating generation of an event of the mobile terminal 100. For example, an alarm may be generated when receiving a call signal, receiving a message, inputting a key signal, and/or inputting a touch. The alarm unit 153 may also output signals in forms different from video signals or audio signals, for example, a signal for indicating generation of an event through vibration. The video signals and/or the audio signals may also be output through the display unit 151 or the audio output unit 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 can control overall operations of the mobile terminal 100. For example, the controller 180 can perform control and processing for voice communication, data communication and/or video telephony. The controller 180 can also include a multimedia module 181 for playing multimedia. The multimedia module 181 may be included in the controller 180 or may be separated from the controller 180.

The controller 180 can perform a pattern recognition process capable of recognizing handwriting input or picture-drawing input applied to the touch screen as characters or images. The power supply unit 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to a software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
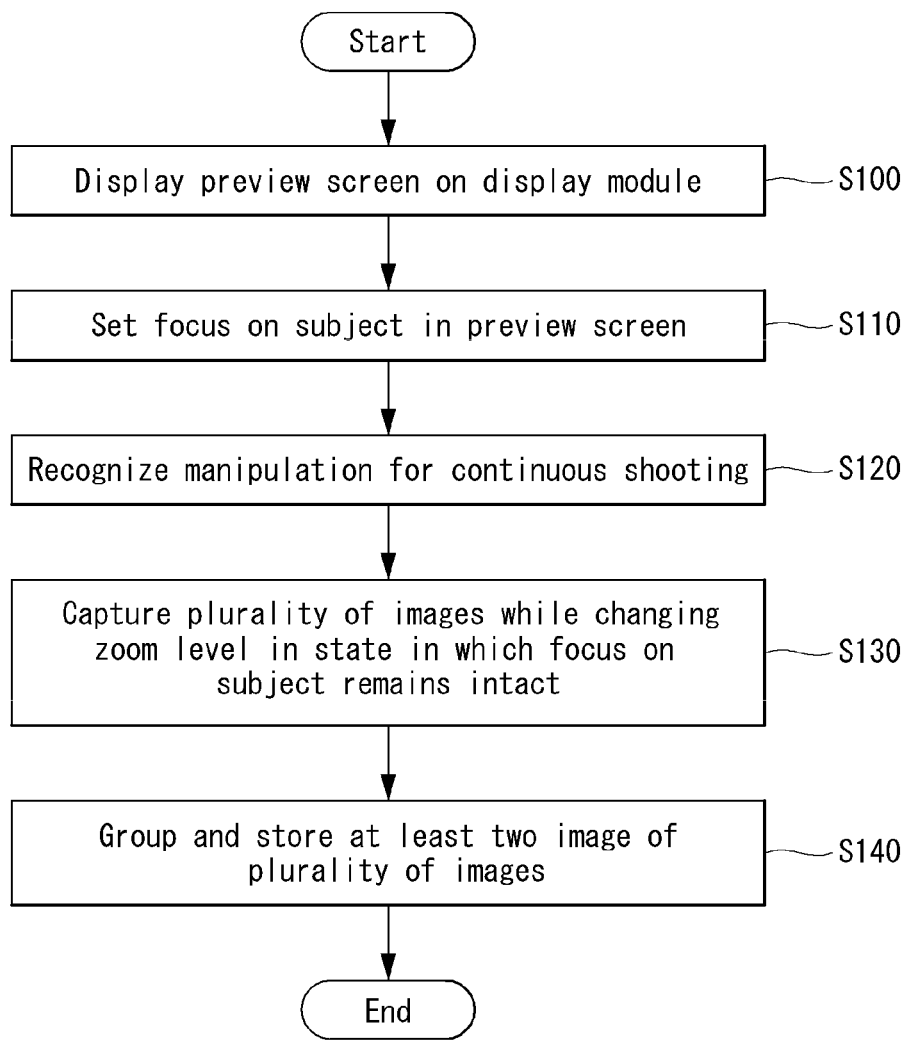
FIG. 2 is a flowchart illustrating an example of a method of operating the electronic device according to an embodiment of the present invention.

FIG. 2 is a flowchart illustrating an example of a method of operating the electronic device according to an embodiment of the present invention. First, the controller 180 obtains a preview screen using the first camera 121 for capturing a front image and displays the preview screen on the display unit 151 (S100). Furthermore, the controller 180 sets the focus on a specific subject or object of a plurality of subjects or objects included in the preview screen at (S110).

The focusing of the specific subject of the plurality of subjects included in the preview screen may be automatically performed by the controller 180. In some embodiments, the focusing of the specific subject may be performed by a user. For example, if the display unit 151 is implemented using a touch screen, a user may set the focus on the specific subject included in the preview screen by touching the specific subject. In this instance, the user may set the focus on a plurality of subjects by touching the plurality of subjects.

The manipulation of a user for continuous shooting is recognized in which the focus on the specific subject has been set (S120). In this instance, the manipulation of the user for continuous shooting may include, for example, the manipulation of a hardware button, the manipulation of a software key, a voice command, and a gesture command. However, the scope of the present invention is not limited to the examples.

When the manipulation of the user for continuous shooting is recognized, the controller 180 captures a plurality of images while changing a zoom level in which the focus on the specific subject remains intact (S130). In this instance, the number of the plurality of images, a zoom level corresponding to each of the plurality of images, etc. may be set or changed by a user.

Thereafter, the controller 180 groups at least two of the plurality of captured images, and stores the grouped at least two images in the memory 160 (S140). In this instance, the controller 180 can perform setting so that the at least two images are sequentially displayed in the order of photographing.

Figure 3:
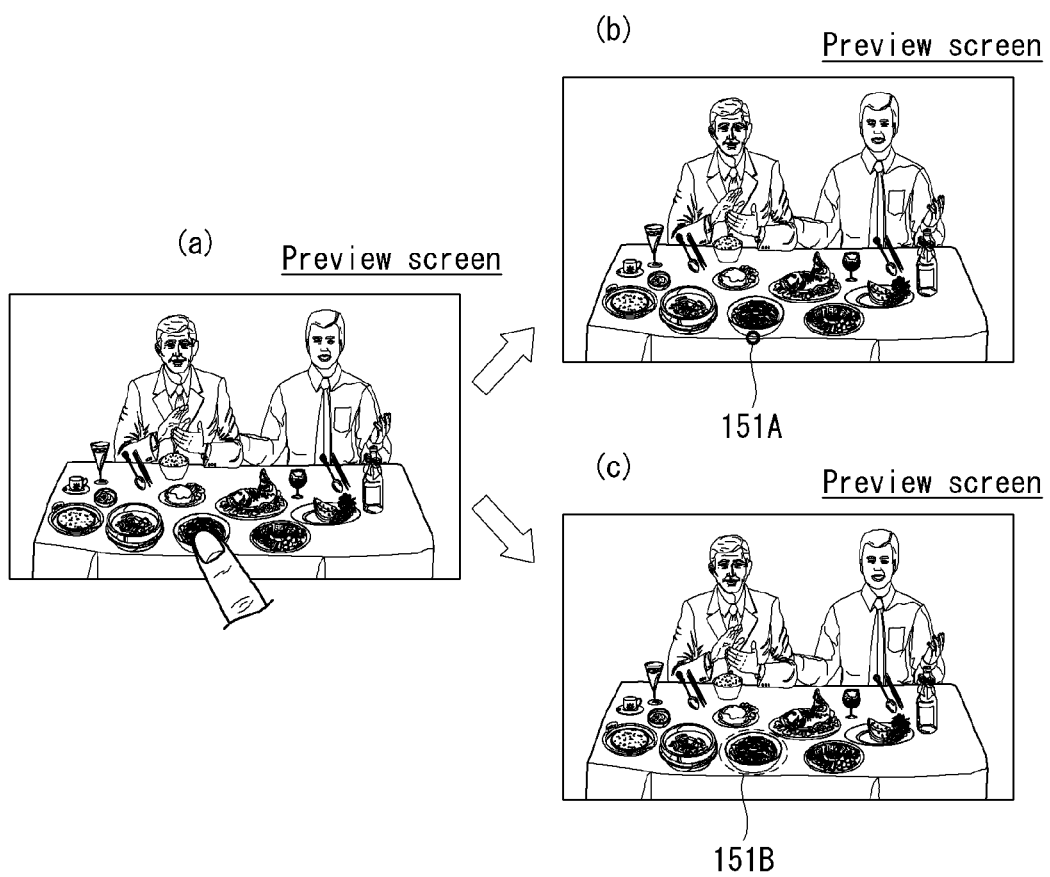
FIG. 3 illustrates an example in which a user sets the focus on a specific object in accordance with the method of operating the electronic device illustrated in illustrated in FIG. 2.

FIG. 3 illustrates an example in which a user sets the focus on a specific object in accordance with the method of operating the electronic device illustrated in illustrated in FIG. 2. In particular, FIG. 3(a) illustrates a user touching a specific subject (e.g., a specific food) in a preview screen. In response thereto, the controller 180 sets the focus on the specific subject. FIGS. 3(b) and 3(c) illustrate examples in which the focus on the specific subject has been set.

Referring to FIG. 3(b), the controller 180 can display a circular image object indicative that the focus on the specific subject 151A has been set. Referring to FIG. 3(c), the controller 180 can display an oval image object indicative that the focus has been set along the edge of the specific subject 151B. However, an image object indicative that the focus on the specific subject has been set is not limited to the aforementioned examples.

FIG. 3(c) illustrates that a user touches another subject 151B in which the focus on the specific subject has been set. In this instance, the controller 180 can also set the focus on another subject. That is, in the electronic device 100 according to an embodiment of the present invention, a user may set a plurality of subjects as the subject of focusing. The focus on the plurality of subjects may be automatically performed by the controller 180.

Figure 4:
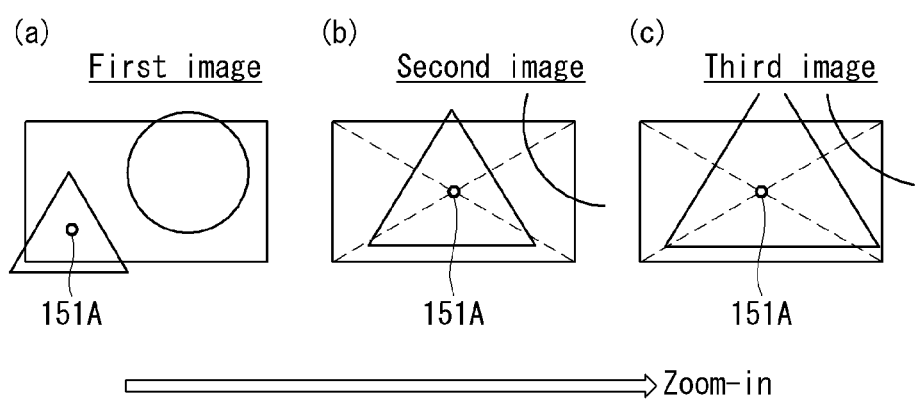
FIG. 4 illustrates an example of a method of capturing a plurality of images in accordance with the method of operating the electronic device illustrated in FIG. 2.

FIG. 4 illustrates an example of a method of capturing a plurality of images in accordance with the method of operating the electronic device illustrated in FIG. 2. More specifically, FIG. 4 illustrates an example in which a plurality of images is captured so that a screen zooms in when a focused subject has been placed at the central region of a captured image.

FIG. 4(a) illustrates that a first image in which a focused triangular specific subject 151A has been placed on the lower left side of the screen is captured. FIG. 4(b) illustrates a second image captured after the first image. From FIG. 4(b), it may be seen that the specific subject has zoomed in when the specific subject has been placed at the central region of the captured image.

FIG. 4(c) illustrates a third image captured after the second image. From FIG. 4(c), it may be seen that the specific subject continues to be placed at the central region of the captured image and the specific subject has further zoomed in.

Figure 5:
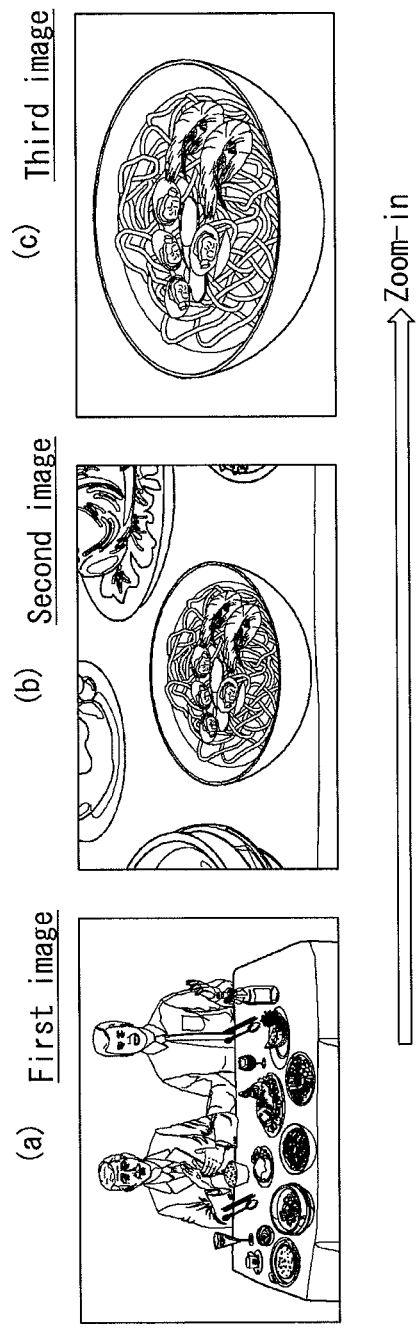
FIG. 5 illustrates an example in which a plurality of images is actually captured in accordance with the method of capturing a plurality of images illustrated in FIG. 4.

FIG. 5 illustrates an example in which a plurality of images is actually captured in accordance with the method of capturing a plurality of images illustrated in FIG. 4. Referring to FIGS. 5(a)-(c), if continuous shooting is performed in which the focus is on a specific food, that is, a subject placed on the lower left side of a screen, photographing may be performed while the screen zooms in so that the specific food is placed at the central region of the screen in second and third images other than the first captured image.

Meanwhile, three images that have been continuously captured may be stored as a single group image. Furthermore, the three images belonging to the group image may be subsequently selected, and a first image, a second image, and a third image may be sequentially displayed in the order of photographing. Accordingly, a user who views the group image may view continuous images that zoom in based on a specific food through the full shot.

Figure 6:
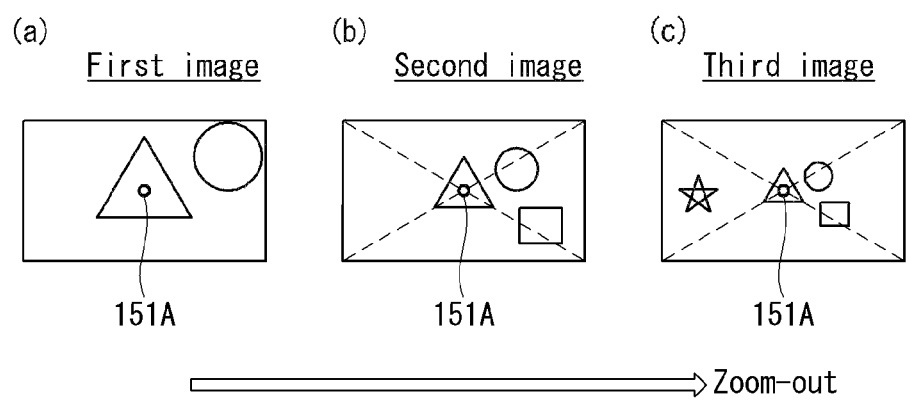
FIG. 6 illustrates another example of a method of capturing a plurality of images in accordance with the method of operating the electronic device illustrated in FIG. 2.

FIG. 6 illustrates another example of a method of capturing a plurality of images in accordance with the method of operating the electronic device illustrated in FIG. 2. Referring to FIGS. 6(a)-(c), if continuous shooting is performed when a specific subject 151A has been focused, the electronic device 100 may continuously capture a plurality of images so that a screen zooms out when the specific subject has been placed at the central region of a captured image.

Figure 7:
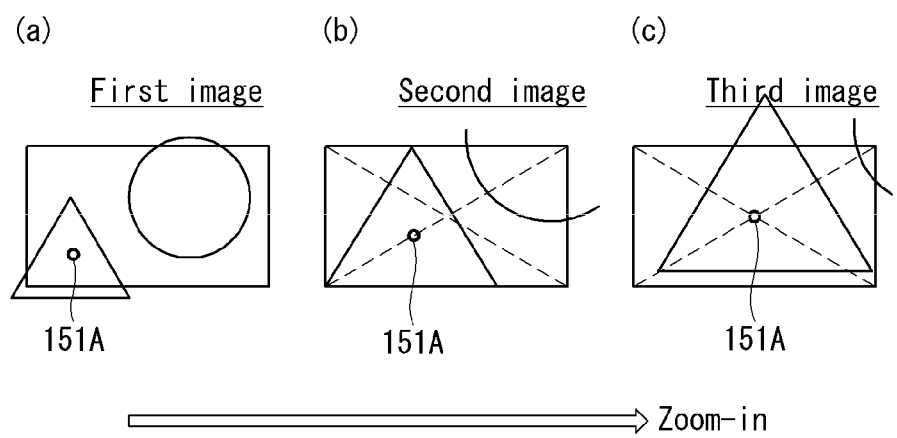
FIG. 7 illustrates yet another example of a method of capturing a plurality of images in accordance with the method of operating the electronic device illustrated in FIG. 2.

Next, FIG. 7 illustrates yet another example of a method of capturing a plurality of images in accordance with the method of operating the electronic device illustrated in FIG. 2. Referring to FIGS. 7(a)-(c), if continuous shooting is performed when a triangular specific subject 151A has been focused, the electronic device 100 may capture a plurality of images so that a screen zooms in while the specific subject gradually moves to the central region of a captured image.

Figure 8:
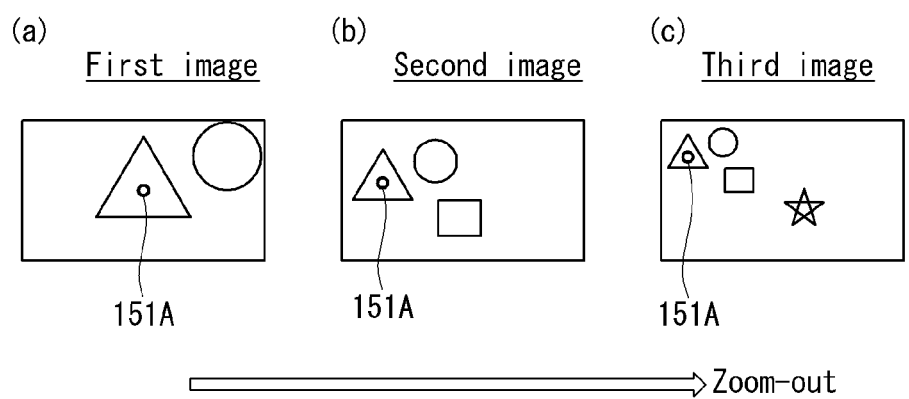
FIG. 8 illustrates still another example of a method of capturing a plurality of images in accordance with the method of operating the electronic device illustrated in FIG. 2.

FIG. 8 illustrates still another example of a method of capturing a plurality of images in accordance with the method of operating the electronic device illustrated in FIG. 2. Referring to FIGS. 8(a)-(c), if continuous shooting is performed when a specific subject has been focused, the electronic device 100 may capture a plurality of images so that a screen zooms out as the specific subject gradually becomes distant from the central region of a captured image.

Figure 9:
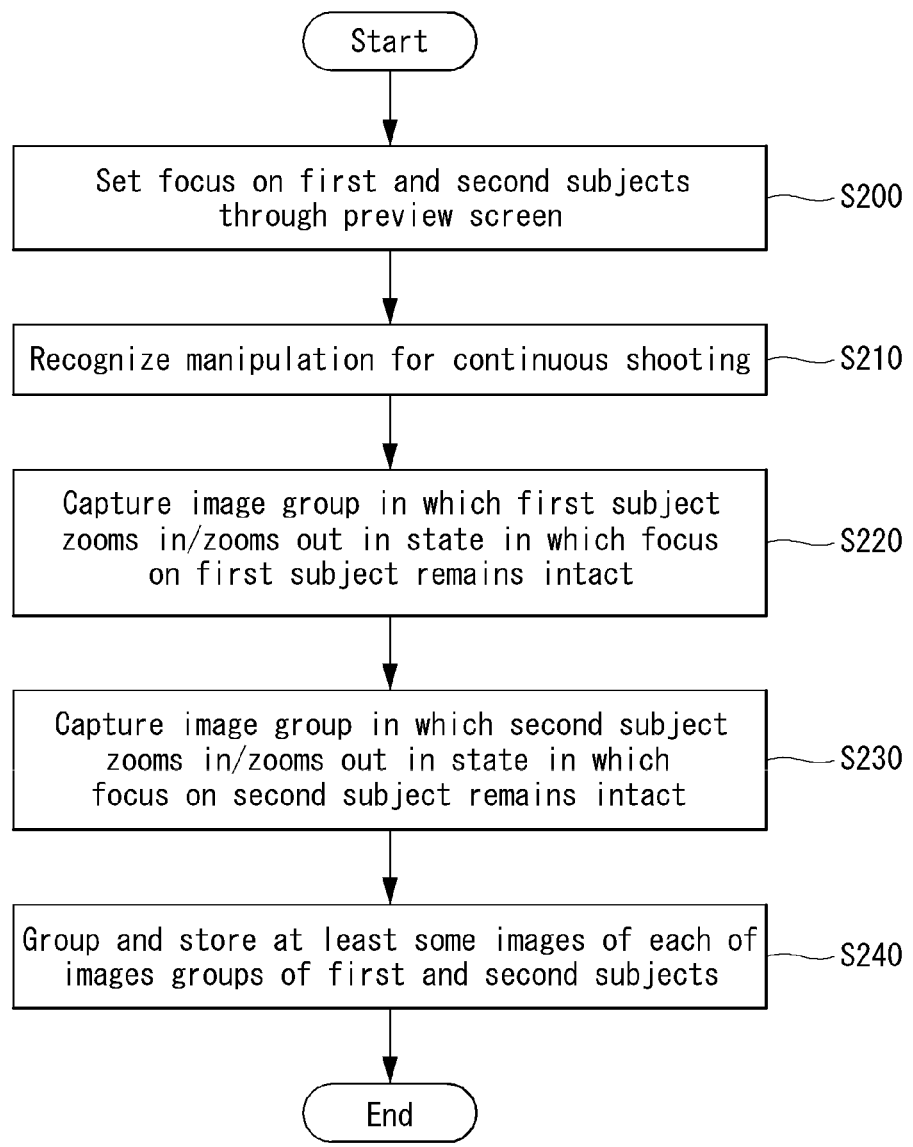
FIG. 9 is a flowchart illustrating a method of operating the electronic device according to another embodiment of the present invention.

FIG. 9 is a flowchart illustrating a method of operating the electronic device according to another embodiment of the present invention. As shown, the controller 180 sets the focus on first and second subjects, included in a preview screen, based on a user's touch on the first and the second subjects (S200). Thereafter, the controller 180 recognizes the manipulation of the user for continuous shooting (S210).

In response to the manipulation, the controller 180 continuously photographs an image group in which the first subject zooms in or zooms out in which the focus on the first subject remains intact (S220). Furthermore, the controller 180 continuously photographs an image group in which the second subject zooms in or zooms out in which the focus on the second subject remains intact (S230).

In this instance, a process of performing continuous shooting on the image group of a subject may be performed like that described with reference to FIGS. 4 to 8, and thus a detailed description thereof is omitted. Meanwhile, unlike in that illustrated in FIG. 9, the image groups of the first and the second subjects may be photographed at the same time, or the image group of the second subject may be first photographed.

After the image groups of the first and the second subjects are photographed, the controller 180 groups at least some of the images of each of the first and the second subjects and stores the grouped images (S240). Such storage of the group image may be performed like the process of generating and storing a group image that has been described in the method of operating the electronic device illustrated in FIG. 2, and thus a detailed description thereof is omitted.

FIGS. 10 and 11 illustrate examples in which continuous shooting is performed on a plurality of subjects in accordance with the method of operating the electronic device illustrated in FIG. 9. FIGS. 10(a) and 11(a) illustrate that the focus on a specific food 1 in a preview screen has been set and the focus on a specific person 2 in the preview screen has been set. Thereafter, continuous shooting is initiated.

In this instance, the controller 180 of the electronic device 100 may first photograph the entire screen (i.e., a full shot) (see FIGS. 10(b) and 11(b)), may capture a zoom-in image of the specific food (see FIG. 10(c)), and may capture a zoom-in image of the specific person (see FIG. 11(c)).

The controller 180 can store a first image of the entire screen and a zoom-in image of the specific food as a group image, or may store the first image and an image of the specific person as a group image. Furthermore, if the group image is selected after being stored, the controller 180 can display a plurality of images included in the selected group image in the order of photographing.

Figure 12:
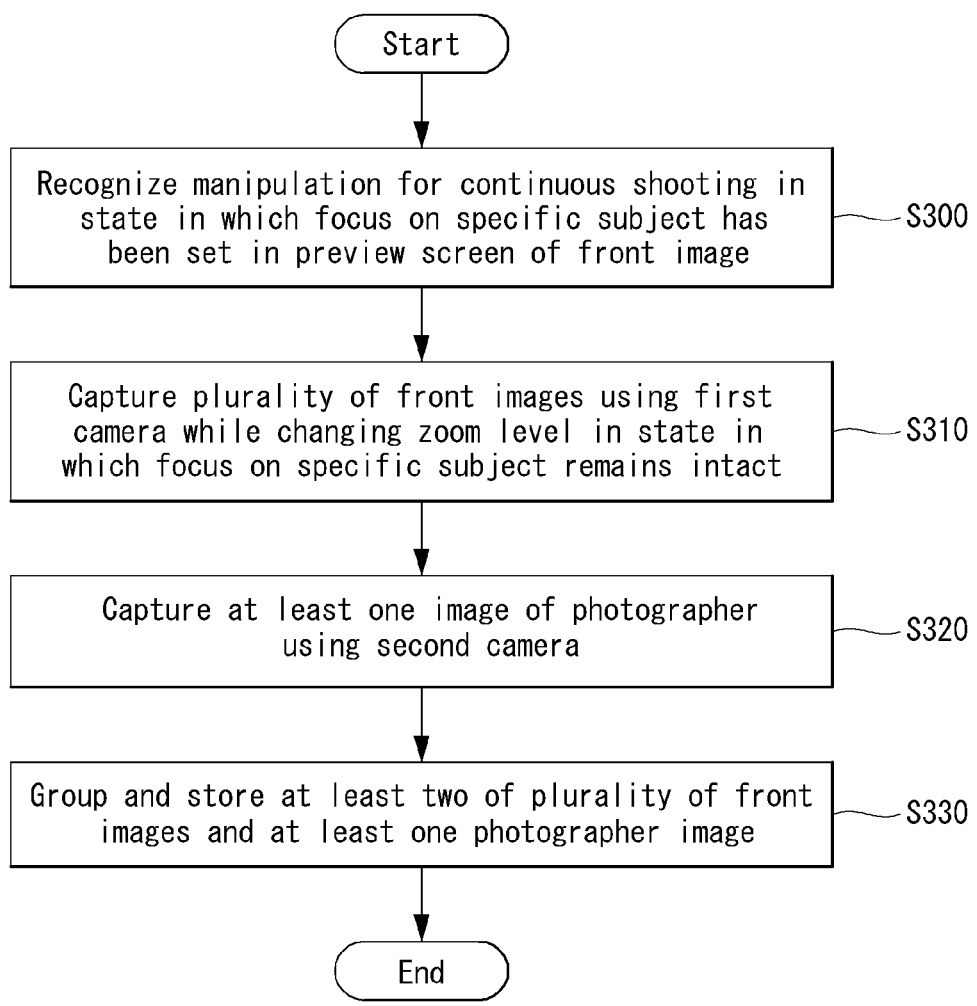
FIG. 12 is a flowchart illustrating a method of operating the electronic device according to yet another embodiment of the present invention.
Figure 13:
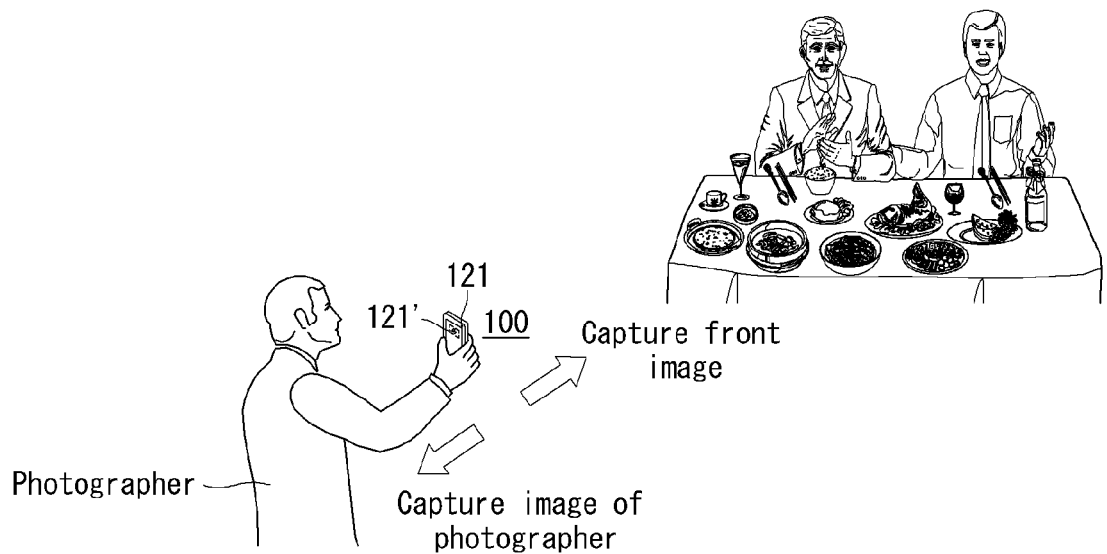
FIG. 13 illustrates an example of a method of capturing an image in accordance with the method of operating the electronic device illustrated in FIG. 12.

FIG. 12 is a flowchart illustrating a method of operating the electronic device according to yet another embodiment of the present invention. FIG. 13 illustrates an example of a method of capturing an image in accordance with the method of operating the electronic device illustrated in FIG. 12.

The manipulation of a user for continuous shooting is recognized in which the focus on a specific subject has been set in a preview screen of a front image (S300). In response to the manipulation, the controller 180 captures a plurality of front images using the first camera 121 for capturing a front image while changing a zoom level in which the focus on the specific subject remains intact (S310). A method of capturing the plurality of front images may be the same as or similar to that illustrated in FIG. 2.

Furthermore, the controller 180 captures at least one image of a photographer using a second camera 121' for capturing a rear image (S320). The at least one image of the photographer may be a stepwise zoom-in or zoom-out image of the photographer.

Thereafter, the controller 180 groups at least two of the plurality of front images and the at least one photographer image, and stores the grouped images (S330). A method of generating and storing a group image using a plurality of images may be easily reasoned from the aforementioned embodiments, and thus a detailed description thereof is omitted.

Figure 14:
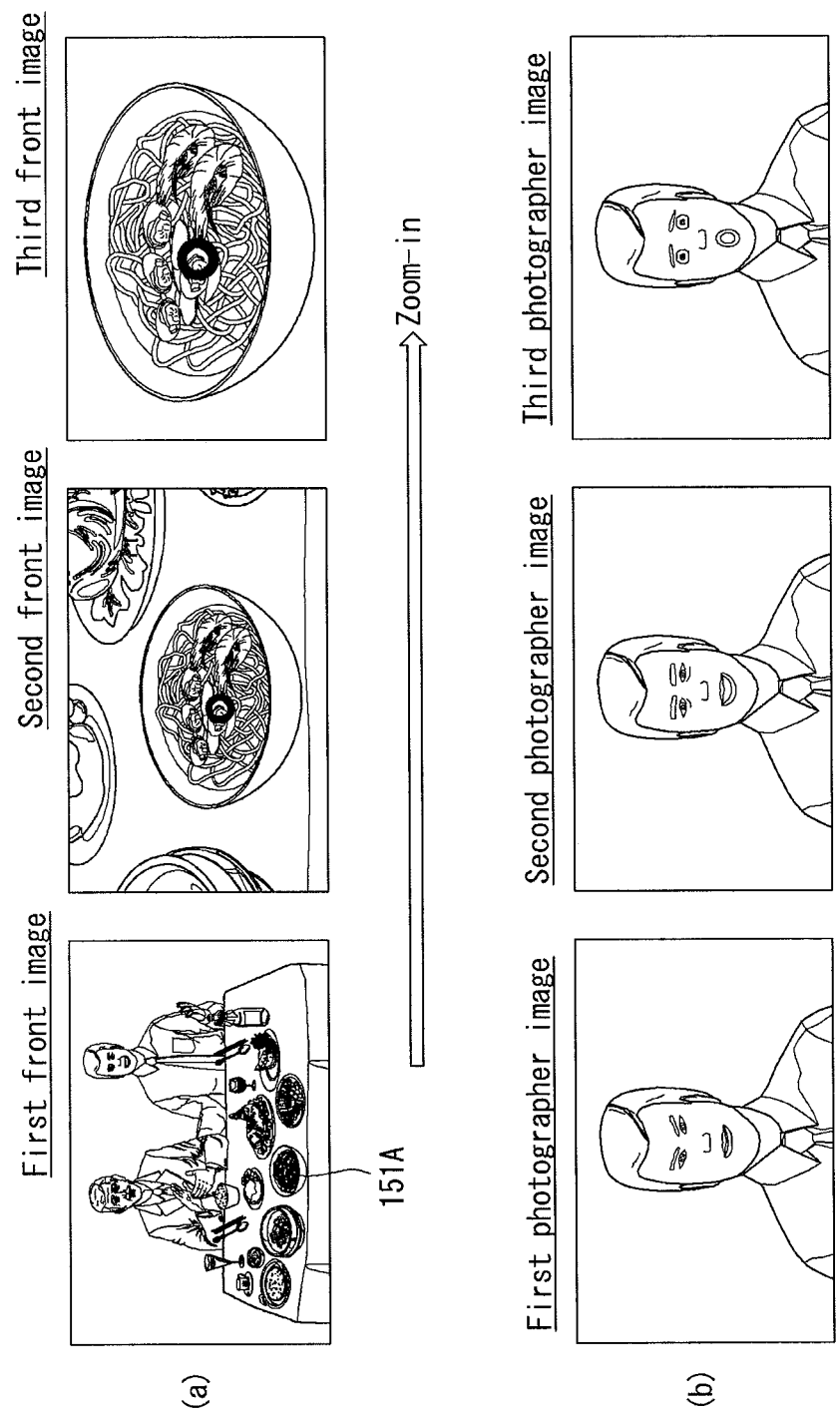
FIG. 14 illustrates an example in which a plurality of front images and a plurality of photographer images are continuously captured in accordance with the method of operating the electronic device illustrated in FIG. 12.

Next, FIG. 14 illustrates an example in which a plurality of front images and a plurality of photographer images are continuously captured in accordance with the method of operating the electronic device illustrated in FIG. 12.

Referring to FIG. 14(a), the controller 180 of the electronic device 100 may capture a first front image, that is, a full-shot front image, using the first camera 121 in which the focus on a specific food 151A in a front image has been set, and then may continuously capture zoom-in images of the specific food.

From FIG. 14(b), it may be seen that the controller 180 continuously captures images of a photographer using the second camera 121'. The images of the photographer have been captured in the same zoom level. However, the controller 180 can continuously capture a plurality of photographer images in different zoom levels.

Next, FIG. 15 illustrates an example in which a group image is generated and stored in accordance with the method of operating the electronic device illustrated in FIG. 12. Referring to FIG. 15(a), the controller 180 of the electronic device 100 may generate a group image including two front images and two images of a photographer, and may store the generated group image.

In this instance, the plurality of images forming the group image may have been selected by a user, or may have been selected in response to predetermined setting. Furthermore, order that the images are configured (subsequently corresponding to order of the images displayed) may be determined in the order of photographing, may be determined by a user, or may be determined in response to predetermined setting.

FIG. 15(b) illustrates the icon of the group image including the plurality of images. From FIG. 15(b), it may be seen that the icon of the group image has a form in which the plurality of images have overlapped with each other. However, the icon of the group image is not limited to the aforementioned form.

Figure 16:
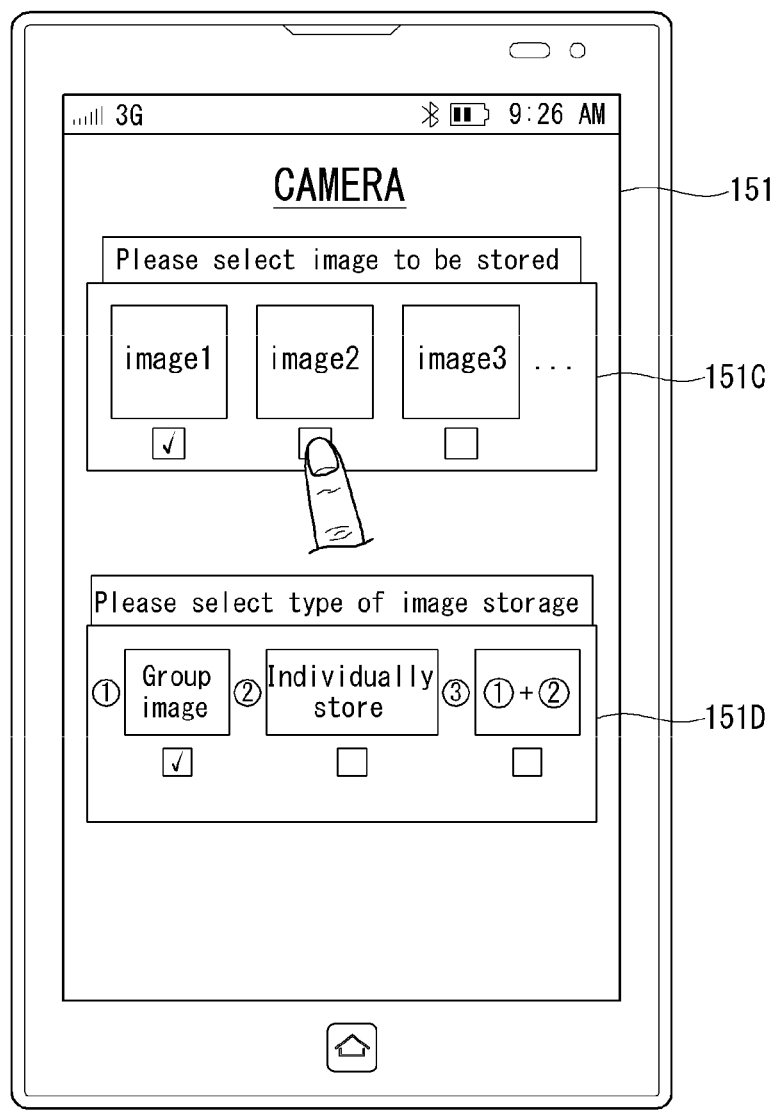
FIG. 16 illustrates examples of user interfaces that are provided in a process of storing continuously captured images in the electronic device according to an embodiment of the present invention.

Next, FIG. 16 illustrates examples of user interfaces that are provided in a process of storing continuously captured images in the electronic device 100 according to an embodiment of the present invention.

Referring to FIG. 16, the user interface may include a user interface 151C for enabling a user to select an image that belongs to the continuously captured images and that will be stored. In some embodiments, the controller 180 of the electronic device 100 may store all of a plurality of continuously captured images without providing the user interface 151C.

The user interface may further include a user interface 151D for enabling a user to select the type of storage of continuously captured images. From FIG. 16, it may be seen that a user may store the continuously captured images in a group image form (①), may individually store the continuously captured images (②), or may store the continuously captured images in both types (③). In some embodiments, the controller 180 can store the continuously captured images according to the option without providing the user interface 151D.

Figure 17:
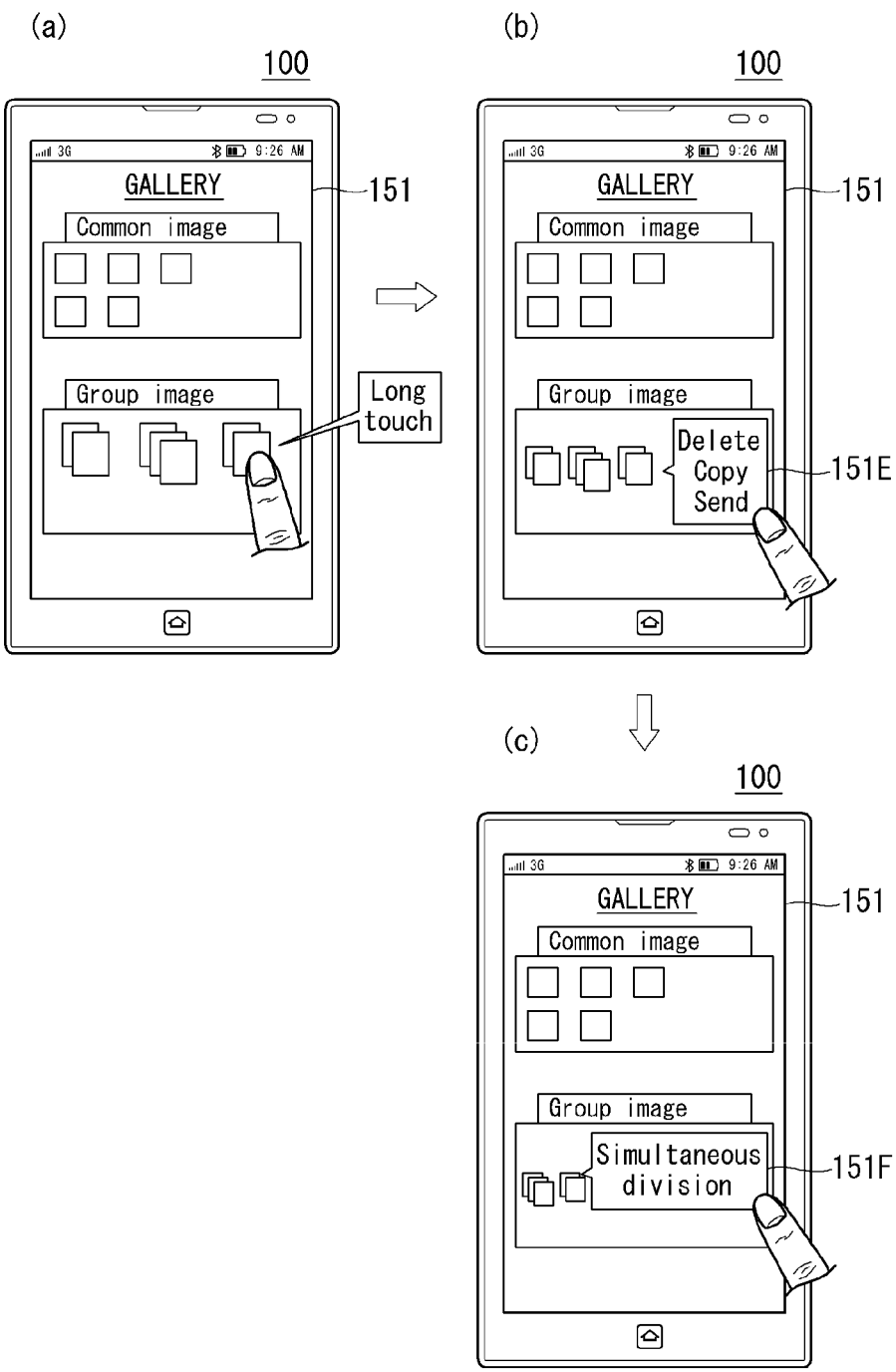
FIG. 17 illustrates examples of user interfaces that are provided in a process of externally sending a group image in the electronic device according to an embodiment of the present invention.

FIG. 17 illustrates examples of user interfaces that are provided in a process of externally sending a group image in the electronic device 100 according to an embodiment of the present invention. A user long touches a specific group image that is stored, as illustrated in FIG. 17(a). In response thereto, the controller 180 provides a user interface 151E for enabling the user to perform a specific function using the selected image, as illustrated in FIG. 17(b). The user selects an item for sending the specific group image in the user interface 151E, as illustrated in FIG. 17(b).

In response thereto, the controller 180 can provide a user interface 151F for enabling a user to determine whether a plurality of images included in the specific group image will be simultaneously transmitted or will be divided and transmitted, as illustrated in FIG. 17(c).

The "simultaneous transmission" may mean that the specific group image is transmitted in a group image form, or may mean that the plurality of images included in the specific group image is simultaneously transmitted in a separated image form.

If the user selects division transmission in the user interface 151F, the controller 180 can further provide a user interface for enabling the user to select an image that belongs to the plurality of images included in the specific group image and that will be transmitted.

In some embodiments, the electronic device 100 according to an embodiment of the present invention may send the group image in a group image form only or may send the group image in an individual image form without providing the aforementioned interfaces.

Figure 18:
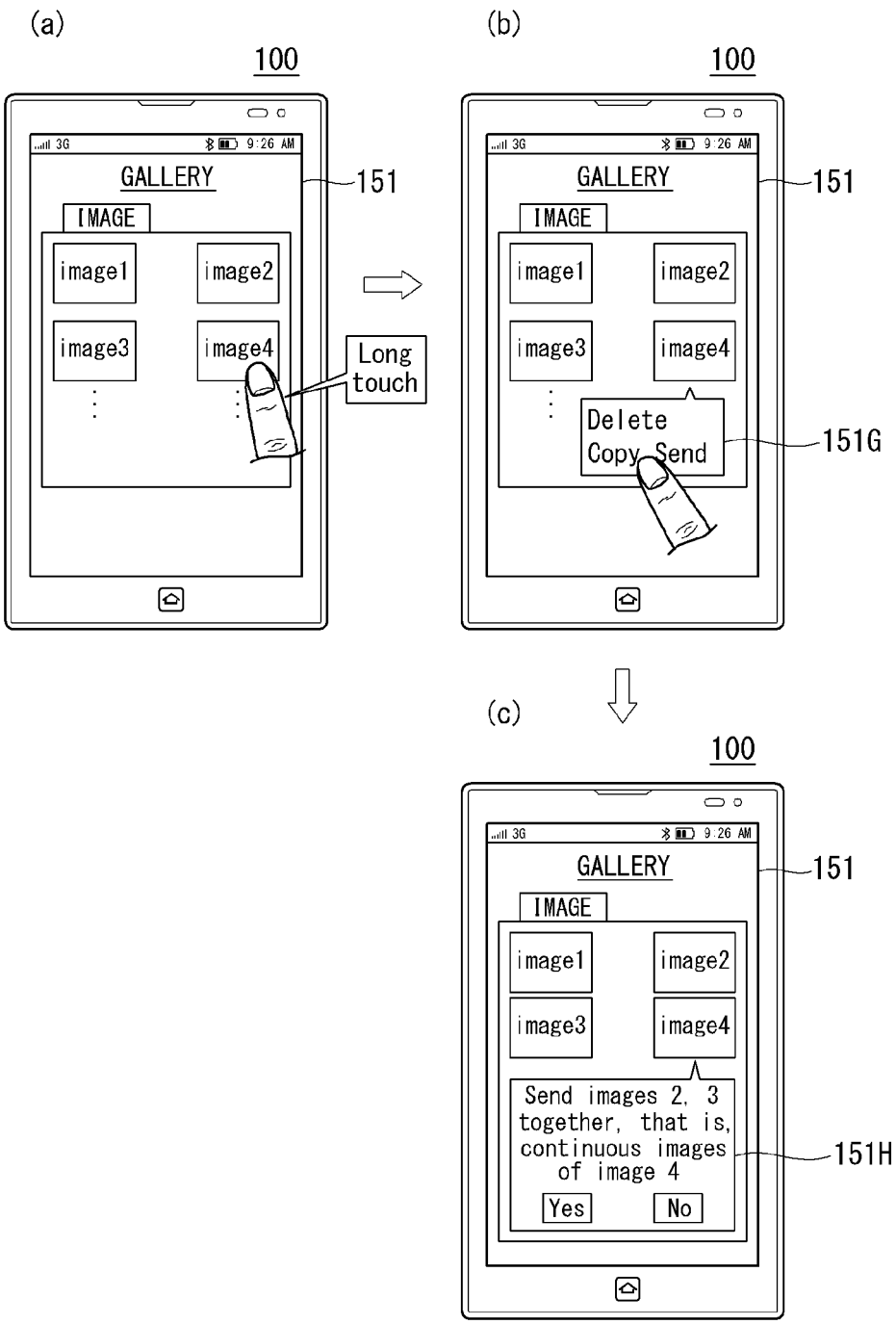
FIG. 18 illustrates examples of user interfaces that are provided in a process of externally sending a group image in the electronic device according to an embodiment of the present invention.

FIG. 18 illustrates examples of user interfaces that are provided in a process of externally sending a group image in the electronic device 100 according to an embodiment of the present invention.

A user long touches a specific image that is stored, as illustrated in FIG. 18(a). In response thereto, the controller 180 provides a user interface 151G for enabling the user to perform a specific function using the selected specific image, as illustrated in FIG. 18(b). The user selects an item for sending the specific image in the user interface 151G, as illustrated in FIG. 18(b).

In response to the selection, the controller 180 can provide a user interface 151H for enabling the user to send other images continuously captured along with the specific image, as illustrated in FIG. 18(c).

Figure 19:
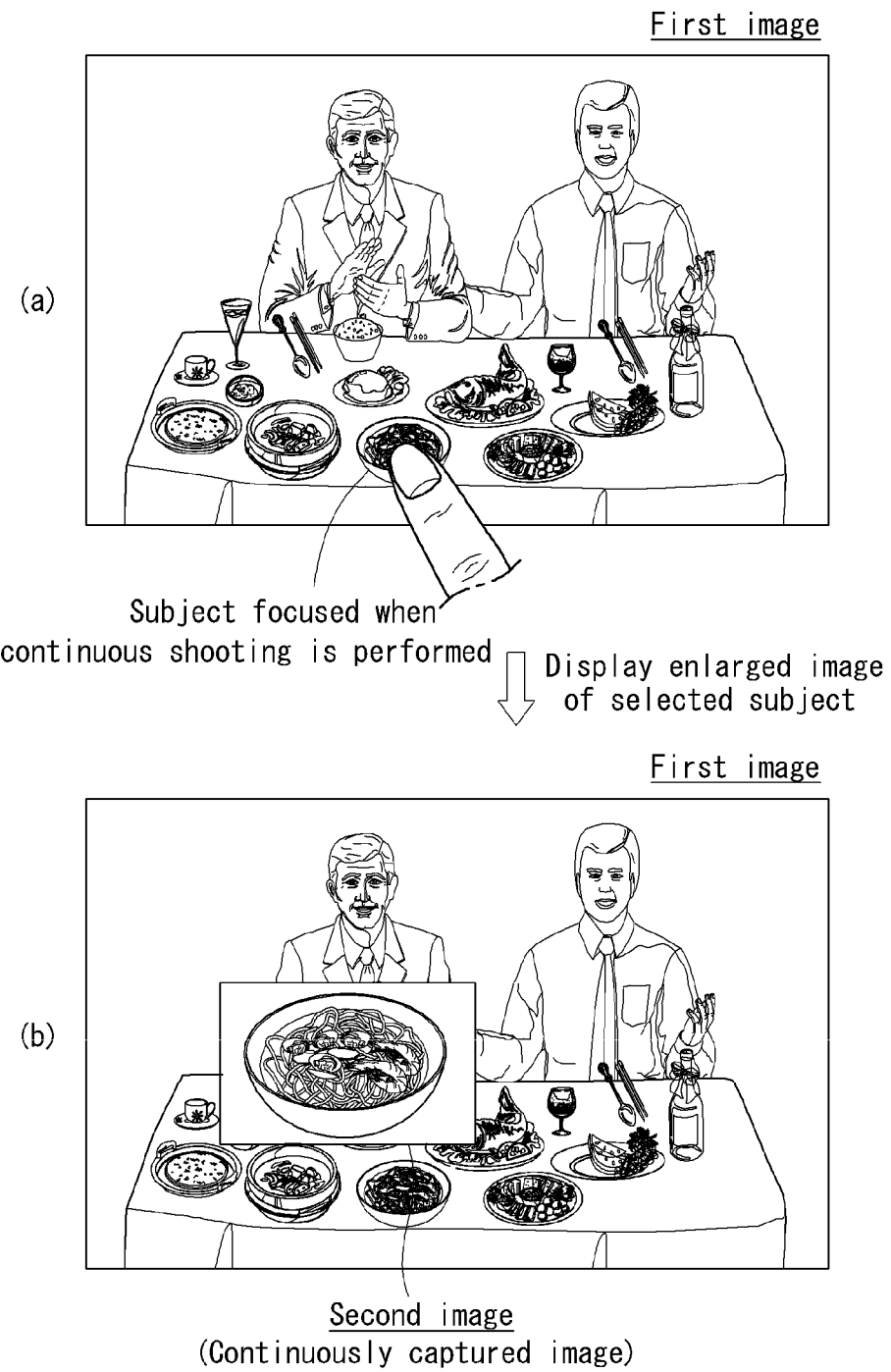
FIG. 19 illustrates an example in which a plurality of images is continuously captured, stored, and provided in the electronic device according to an embodiment of the present invention.

FIG. 19 illustrates an example in which a plurality of images is continuously captured, stored, and provided in the electronic device 100 according to an embodiment of the present invention. FIG. 19(a) illustrates that a specific subject included in a specific image is selected when the specific image has been selected from a plurality of images and displayed on the touch screen 151. In response to the selection, the controller 180 of the electronic device 100 may further display a zoom-in image of the specific subject on the touch screen 151, as illustrated in FIG. 19(b).

Figure 20:
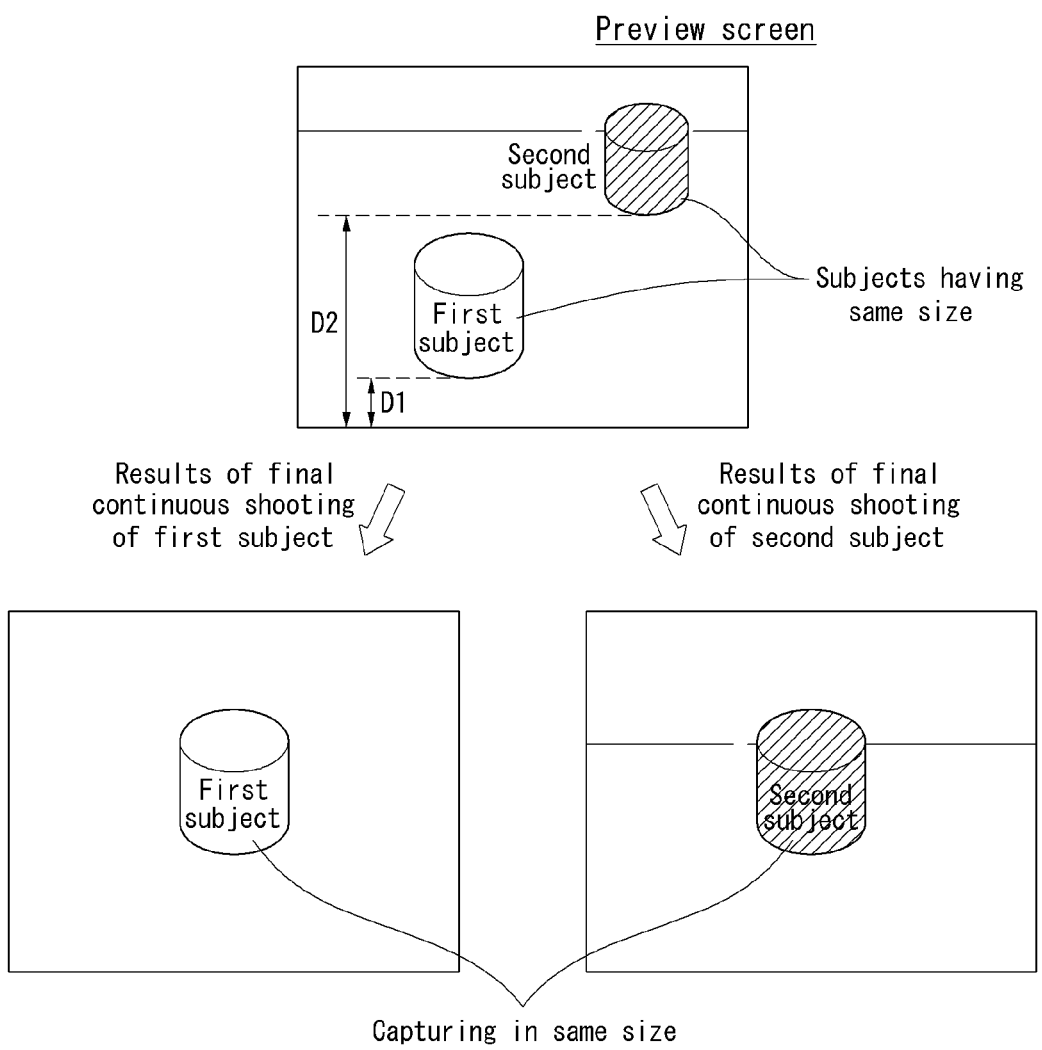
FIG. 20 illustrates another example in which continuous shooting is performed when a plurality of subjects has been focused in the electronic device according to an embodiment of the present invention.

FIG. 20 illustrates another example in which continuous shooting is performed when a plurality of subjects has been focused in the electronic device 100 according to an embodiment of the present invention. FIGS. 20(a) and 20(b) illustrates that first and second subjects placed at different locations from the electronic device 100 and having the same size are displayed on a preview screen. In this state, continuous shooting is performed. In response to such operation, the controller 180 of the electronic device 100 may perform continuous shooting on each of the first and the second subjects so that the first and the second subjects are photographed in the same size.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
a first camera configured to capture a first image;
a second camera configured to capture a second image;
a touchscreen configured to display a first preview screen of the first image obtained by the first camera and a second preview screen of the second image obtained by the second camera; and
a controller configured to:
receive a focus input designating an object included in the first preview screen is to be focused,
receive an input for performing continuous capture;
control the first camera to capture a plurality of fits images in different zoom levels while maintaining a focus on the designated object intact based on the received input for performing the continuous capture,
control the second camera to capture at least one second image when the plurality of first images is captured by the first camera,
generate and store a group image including at least of the plurality of first images and the at least one second image, and
generate an icon of the group image having a form in which the at least two of the plurality of first images and the at least one second image are overlapped with each other.

2. The electronic device of claim 1,
wherein the controller is further configured to:
control the second camera to capture at least one image of a photographer when the plurality of first images is captured by the first camera,
group and store at least two of the plurality of first images and the at least one photographer image, and
perform a setting so that the at least two first images and the at least one photographer image are displayed in order of photographing.

3. The electronic device of claim 2, wherein the controller is further configured to:
control the second camera to capture a plurality of images of a face of the photographer when the plurality of images of the photographer is captured by the first camera,
group and store the at least two images and at least two of the plurality of photographer images, and
perform a setting so that the at least two images and the at least two photographer images are displayed in order of photographing.

4. A method of controlling an electronic device, the method comprising:
capturing, via a first camera of the mobile terminal, a first image;
capturing, via a second camera of the mobile terminal, a second image;
displaying, via a touchscreen of the mobile terminal, a first preview screen of the first image obtained by the first camera and a second preview screen of the second image obtained by the second camera;
receiving, via a controller of the mobile terminal, a focus input designating an object included in the first preview screen is to be focused;
receiving, via the controller, an input for performing continuous capture;
controlling, via the controller, the first camera to capture a plurality of first images in different zoom levels while maintaining a focus on the designated object intact based on the received input for performing the continuous capture;
controlling, via the controller, the second camera to capture at least one second image when the plurality of first images is captured by the first camera;
generating and storing a group image including at least two of the plurality of first images and the at least one second image; and
generating an icon of the group image having a form in which the at least two of the plurality of first images and the at least one second image are overlapped with each other.

5. The method of claim 4, further comprising:
controlling a second camera on the mobile terminal to capture at least one image of a photographer when the plurality of first images is captured by the first camera;
grouping and storing at least two of the plurality of first images and the at one photographer image; and
performing a setting so that the at least two first images and the at least one photographer image are displayed in order of photographing.

6. The method of claim 5, further comprising:
controlling the second camera to capture a plurality of images of a face of the photographer when the plurality of images of the photographer is captured by the first camera;
grouping and storing the at least two images and at least two of the plurality of photographer images; and
performing a setting so that the at least two images and the at least two photographer images are displayed in order of photographing.

* * * * *